(12) United States Patent
Arslan

(10) Patent No.: US 7,620,122 B1
(45) Date of Patent: Nov. 17, 2009

(54) COMMUNICATION APPARATUS INCLUDING A DEMODULATOR HAVING A TONE DETECTION MECHANISM

(75) Inventor: Guner Arslan, Austin, TX (US)

(73) Assignee: ST-Ericsson SA, Geneva (CH)

( * ) Notice: Subject to any disclaimer, the term of this patent is extended or adjusted under 35 U.S.C. 154(b) by 621 days.

(21) Appl. No.: 11/170,526

(22) Filed: Jun. 29, 2005

(51) Int. Cl.
*H03D 1/24* (2006.01)

(52) U.S. Cl. .................. 375/320; 375/316; 329/311

(58) Field of Classification Search ............ 375/320, 375/316; 329/311
See application file for complete search history.

(56) References Cited

U.S. PATENT DOCUMENTS

| | | | |
|---|---|---|---|
| 6,345,251 B1 | 2/2002 | Jansson | |
| 6,434,198 B1 * | 8/2002 | Tarraf | 375/259 |
| 6,611,804 B1 | 8/2003 | Dorbecker | |
| 2002/0057765 A1 | 5/2002 | Hyziak | |
| 2002/0061076 A1 * | 5/2002 | Seki et al. | 375/316 |
| 2003/0053603 A1 | 3/2003 | Vejlgaard | |
| 2005/0002472 A1 * | 1/2005 | Lee et al. | 375/316 |
| 2006/0023848 A1 | 2/2006 | Mohler | |
| 2006/0067394 A1 * | 3/2006 | Chen | 375/229 |

OTHER PUBLICATIONS

The cellular text telephone modem—the solution for supporting text telephone functionality in GSM networks Dorbecker, M.; Hellwig, K.; Jansson, F.; Frankkila, T.; Acoustics, Speech, and Signal Processing, 2001. Proceedings. (ICASSP '01). 2001 IEEE International Conference on vol. 3, May 7-11, 2001 pp. 1441-1444 vol. 3.*
Kevin Banks; The Goertzel Algorithm; Aug. 28, 2002; Embedded. com (http://www.embedded.com/showArticle.jhtml?articleID=9900722).

* cited by examiner

*Primary Examiner*—Shuwang Liu
*Assistant Examiner*—Michael R Neff
(74) *Attorney, Agent, or Firm*—William J. Kubida; Scott J. Hawranek; Hogan & Hartson LLP

(57) ABSTRACT

A communication apparatus includes a receiver may receive a signal including one or more frequencies associated with a symbol. The symbol may be any type of symbol such as a text telephone symbol encoded according to a cellular text telephone modem (CTM) protocol, for example. The receiver includes a demodulator unit that may be configured to determine the one or more the frequencies associated with the symbol and to generate a soft decision corresponding to the one or more frequencies. The soft decision may be based upon energies associated with the one or more frequencies.

25 Claims, 7 Drawing Sheets

COMMUNICATION APPARATUS INCLUDING A DEMODULATOR HAVING A TONE DETECTION MECHANISM

BACKGROUND OF THE INVENTION

1. Field of the Invention

This invention relates to mobile telephony and, more particularly, to demodulation of symbol data received via a mobile telephone medium.

2. Description of the Related Art

Text Telephone (referred to as TTY in North America) equipment has been used in the fixed telephone network for many years to transmit text and speech through the conventional telephone network. In such systems, a conventional telephone is connected to a terminal and the user enters the characters via a keyboard. Some types of TTY systems the telephone handset may be acoustically coupled to the terminal, while in other types of TTY systems the telephone may be directly connected. The terminal encodes the characters into tones (using a mapping code) which are then transmitted from the terminal through the normal voice path of the conventional telephone. A TTY terminal, in conjunction with a telephone on the receiver side, may decode the tones and display the characters on the terminal display.

In the United States, some cellular telephony systems support TTY services using a Baudot Code to map the characters using two tones: 1400 Hz and 1800 Hz. However, conventional digital cellular systems may not provide satisfactory character error rates for text transmitted in the speech channel using the traditional TTY modulation techniques developed for the fixed network. Thus, a new standard has been created to provide this cellular TTY service. The new standard is commonly referred to as Cellular Text Telephone Modem (CTM). Some conventional CTM demodulation algorithms include the use of complex and sometimes inefficient correlation and cross-correlation functions.

SUMMARY

Various embodiments of a communication apparatus including a demodulator having a synchronization mechanism and a tone detection mechanism are disclosed. In one embodiment, the communication apparatus includes a receiver having a demodulator unit configured to receive a signal that may include one or more frequencies associated with a symbol. The demodulator unit may determine the one or more frequencies associated with the symbol and may generate a soft decision corresponding to the one or more frequencies. The soft decision may be based upon energies associated with the one or more frequencies.

In one specific implementation, each symbol is a text telephone symbols such as symbols that include a plurality of bits encoded according to a cellular text telephone modem (CTM) protocol.

In another specific implementation, the demodulator unit may use a Goertzel algorithm to determine an amplitude corresponding to each of the one or more frequencies.

Figure 1:
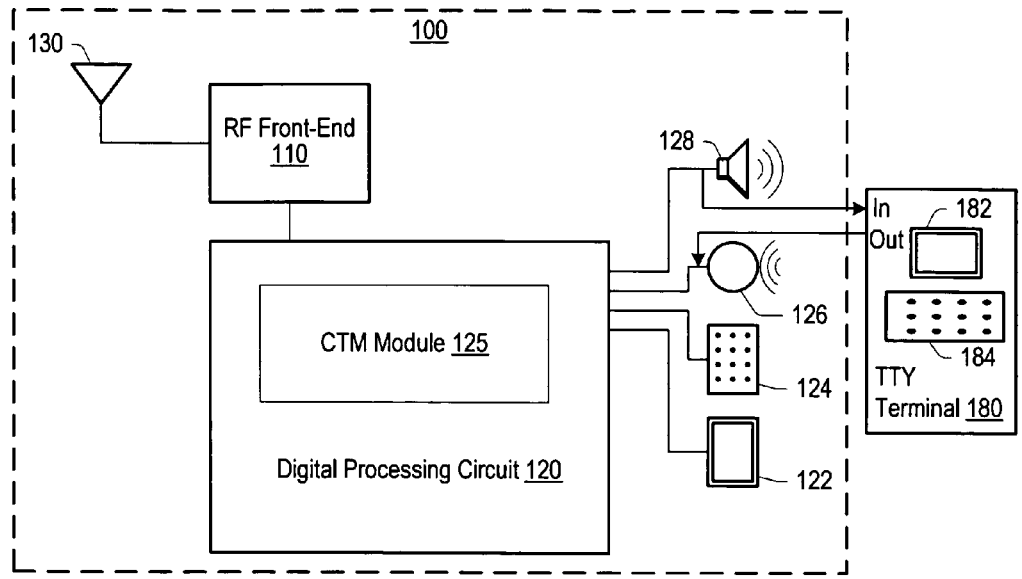
FIG. 1 is a generalized block diagram of one embodiment of a communication apparatus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a generalized block diagram of a communication apparatus 100 is shown. Communication apparatus 100 includes an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. It is noted that in various embodiments, communication apparatus 100 may include additional components and/or couplings not shown in FIG. 1 and/or exclude one or more of the illustrated components, depending on the desired functionality. It is further noted that components that include a reference number and letter may be referred to by the reference number alone where appropriate, for simplicity.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may employ a time-division multiple access (TDMA) standard or a code division multiple access (CDMA) standard to implement a standard such as the Global System for Mobile Communications (GSM) standard, the Personal Communications Service (PCS) standard, and the Digital Cellular System (DCS) standard. In addition, many data transfer standards that work cooperatively with the GSM technology platform may also be supported. For example, communication apparatus 100 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, among others. In addition, as mentioned above, communication apparatus 100 may implement the emerging Cellular Text Telephone Modem (CTM) standard.

RF front-end circuit 110 may accordingly include circuitry to provide RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP (not shown in FIG. 1), as well as a variety of specific peripheral circuits such as memory controllers, direct memory access (DMA) controllers, hardware accelerators, voice coder-decoders (CODECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

In the illustrated embodiment, communication apparatus 100 is coupled to a TTY terminal 180. TTY terminal 180 may include a keyboard 184 and a display 182. As such, TTY terminal 180 may provide a means for entering and displaying text characters for transmission as well as displaying received text characters. For example, a user may connect the input of TTY terminal 180 to the audio output of communication apparatus 100 and the output of TTY terminal 180 to the audio input of communication apparatus 100. In one embodiment, the user may enter text via keyboard 184. The text may appear on display 182. In addition, any text that is received by TTY terminal 180 may appear on display 182. In one embodiment, TTY terminal 180 may convert text characters entered by a user into TTY tones according to a Baudot code or other map and then provide those tones to communication apparatus 100. Similarly, TTY terminal 180 may receive and convert the TTY tones to text characters for display.

As shown, digital processing circuit 120 includes a CTM module 125. CTM module 125 may perform signal-processing tasks associated with CTM modulation and demodulation. For example, CTM module 125 may perform tasks such as CTM tone detection and CTM symbol synchronization. CTM module 125 may enable communication apparatus 100 to be used to send and receive text messages from a standard TTY terminal.

As described above, CTM allows reliable transmission of a text telephone conversation alternating with a speech conversation through the existing speech communication paths in cellular mobile phone systems. CTM maps each text character to 8 bits, which may then be encoded with an error-correction code. This process may generate 32 bits for each character. After the addition of control bits (e.g., mute, resync, and preamble bits) and interleaving, the bits are grouped into pairs. Each pair is represented by a sinusoid of 40 samples with one of the frequencies of 400, 600, 800, and 1000 Hz. The sampling rate is 8000 Hz. Accordingly, the bit rate over the channel is 2 bits/5 ms=400 bits/sec. Additional details regarding CTM may be found in the latest revision of the CTM specification 3GPP TS 26.226.

Figure 2:
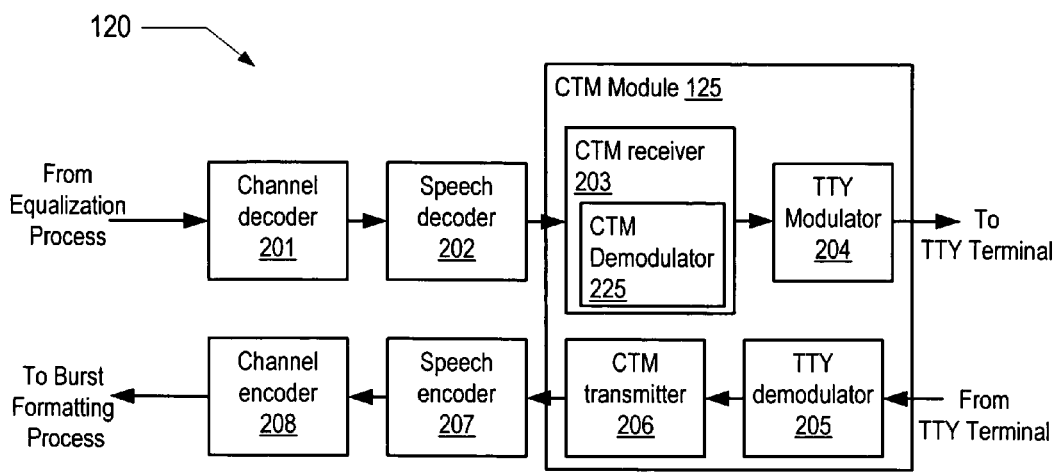
FIG. 2 is a block diagram illustrating specific aspects of one embodiment of the digital processing circuit of FIG. 1.

Referring to FIG. 2, a block diagram illustrating specific aspects of one embodiment of the digital processing circuit of FIG. 1 is shown. Digital processing circuit 120 includes a channel decoder 201 coupled to a speech decoder 202. Speech decoder is coupled to CTM module 125, which includes a CTM receiver 203 coupled to a TTY modulator 204. The output of TTY modulator 204 may be provided to a TTY terminal such as TTY terminal 180 of FIG. 1, for example. In addition, CTM module 125 includes a TTY demodulator 205 coupled to a CTM transmitter 206. CTM transmitter 206 is coupled to speech encoder 207, which is in turn coupled to channel encoder 208. It is noted that other components within digital processing circuit 120 are not shown for simplicity.

In the receive path, in one embodiment, channel decoder 201 may receive channel-equalized soft symbol data from an equalization process. Channel decoder 201 may provide a number of sample bits to speech decoder 202, which may create speech samples in groups of 160 pulse code modulated (PCM) samples. Speech decoder 202 may store the PCM samples in a buffer (not shown in FIG. 2). The CTM receiver 203 may determine whether the samples are CTM samples or speech samples. If the samples are speech samples, the CTM module 125 and its associated CTM processing may be bypassed. However, if CTM receiver 203 determines that the samples are CTM symbols, as will described in greater detail below in conjunction with the descriptions of FIGS. 3-7, CTM receiver 203 includes a CTM demodulator 225 that may demodulate the samples in the buffer into soft symbols, 40 samples at a time. The soft symbols may be de-interleaved and decoded by, for example, a Viterbi decoder (shown in FIG. 3), into bits which may then be grouped into eight bits and mapped back into characters. The characters may be modulated by TTY modulator 204 into TTY tones according to the Baudot code or other suitable mapping. The TTY modulated signal may be provided to a TTY terminal such as TTY terminal 180 of FIG. 1, for example.

In the transmit path, in one embodiment, a TTY terminal may provide a TTY modulated signal that includes text characters encoded into tones mapped using a Baudot code, for example. The TTY modulated signal may be demodulated into character bits by TTY demodulator 205. CTM transmitter 206 may create symbol bits by generating error correcting code bits such as a forward error correcting code (FEC) bits and control bits, and adding them to each character bit. CTM transmitter 206 may group the symbol bits into bit pairs and for each bit pair, generate a 40-sample sinusoid having one of the following frequencies: 400, 600, 800, or 1000 Hz (See Table 1 below). These CTM sinusoid samples may be placed into a buffer in groups of four, encoded by the speech encoder 207 and the channel encoder 208, and provided to a burst formatting process for transmission.

Figure 3:
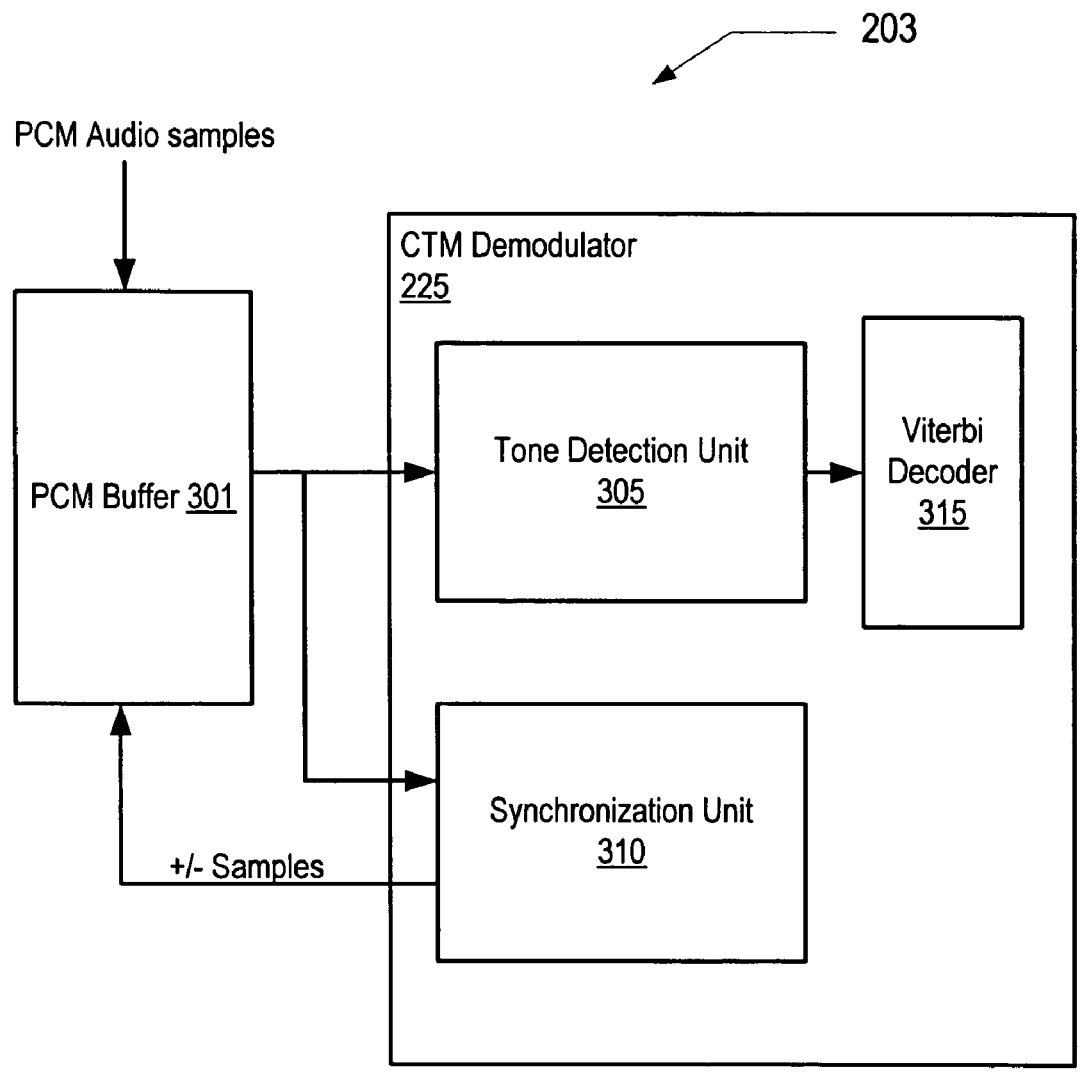
FIG. 3 is a block diagram illustrating one embodiment of the CTM receiver of FIG. 2.

Turning to FIG. 3, a block diagram illustrating one embodiment of the CTM receiver of FIG. 2 is shown. CTM receiver 203 includes a PCM buffer 301 that is coupled to CTM demodulator 225. In the illustrated embodiment, CTM demodulator 225 includes a tone detection unit 305 coupled to a decoder such as a Viterbi decoder 315, and a synchronization unit 310. Tone detection unit 305 and synchronization unit 310 are coupled to PCM buffer 301. It is noted that tone detection unit 305 and synchronization unit 310 may be implemented as software, hardware or any suitable combination, as desired.

In one embodiment, tone detection unit 305 may be configured to receive samples from PCM buffer 301, nominally, 40 samples at a time. Thus, tone detection unit 305 may detect the CTM tones and convert the tones into corresponding bit pairs. As described above, CTM symbols are transmitted as bit pairs represented as 40-sample sinusoids at one of four frequencies (tones). Depending on the values of the bit pairs, one of the frequencies 400 Hz, 600 Hz, 800 Hz, and 1000 Hz may be used, provided that at least one of the two bits is not marked to be muted. If both bit 0 and bit 1 are marked to be muted, a sequence of 40 zero-valued samples may be generated. Table 1 illustrates the bit pair/frequency map used by a CTM modulator.

TABLE 1

CTM bit pair/frequency map

|  | bit 1 = 0 | bit 1 = 1 | bit 1 = muted |
| --- | --- | --- | --- |
| bit 0 = 0 | 400 Hz | 600 Hz | 600 Hz |
| bit 0 = 1 | 800 Hz | 1000 Hz | 1000 Hz |
| bit 0 = muted | 800 Hz | 1000 Hz | 0 Samples |

Accordingly, as described in greater detail below in conjunction with the description of FIG. 4, tone detection unit 305 may use a Goertzel algorithm to determine which frequency component(s) are included in a received symbol and then determine from the frequency component(s) what bit pair (if any) the frequency represents. Since the demodulated bits may be used in decoding the forward error correction information, tone detection unit 305 may provide soft decisions or, in other words, demodulated decision bits along with other information representing the confidence of the decision. These soft decisions may be passed to Viterbi decoder 315 for further decoding of the FEC. As such, Viterbi decoder 315 may use the soft decisions to make a hard decision of the original data bits.

CTM demodulator 225 may also keep track of symbol timing and compensate for possible timing offset in the received CTM symbols. To do this it may be necessary to know where one symbol begins and ends. When demodulating CTM signals in groups of 40 samples, it is assumed that all 40 samples belong to the same tone. It is convenient for CTM transmitters to place four perfectly aligned, 40-sample CTM symbols into each 160-sample PCM buffer. However, this alignment may be lost during the transmission of the CTM signal, such as might be the case during a base station handover, for example. Therefore, a CTM receiver such as CTM receiver 203 may detect any misalignments in CTM symbols and adjust accordingly. As such, in one embodiment, synchronization unit 310 may track the timing and dynamically adjust the received samples to align the tones.

As will be described in greater detail below in conjunction with the description of FIG. 6A, 6B and FIG. 7, in one embodiment, synchronization unit 310 may be configured to track one or more characteristic maximum peak values that occur in a number of expected symbol values. More particularly, synchronization unit 310 may generate an expected value vector that includes a plurality of expected values. The expected values may be generated by successively averaging each sample of a 40-sample symbol with respective samples of previous symbols. The timing of the peak values may be adjusted by adding or removing samples from the next symbol that is read from PCM buffer 301.

A number of methods may be used for detecting CTM tones such as performing a Discrete Fourier transform (DFT) algorithm on the input signal such as any type of Fast Fourier transform (FFT) algorithm, passing the received signal through bandpass filters centered around each tone, or correlating the received signal with local copies of sinusoids with the standard frequencies. However depending on such characteristics as the number of frequencies and the number of samples, for example, the above methods may be computationally inefficient.

One specific type of FFT algorithm, referred to as the Goertzel algorithm, may provide an efficient method to calculate the FFT coefficients if less than $2 \log_2 N$ FFT coefficients are required. In embodiments using CTM, the natural choice for N is 40 (the number of samples in one CTM symbol). Thus, $2 \log_2 40 = 10.64$ which means the Goertzel algorithm may be more efficient than calculating a full FFT if 10 or less tones are of interest. The Goertzel algorithm with N=40 may also be a good match because this choice implies that we sample the frequency domain at 8000/40=200 Hz intervals, meaning we will have sample points at the exact CTM tones of 400, 600, 800, and 1000 Hz. In contrast, performing an FFT would require N to be a power of two, in which case there is not a single N that would enable exact samples on each of the frequencies.

The Goertzel algorithm may be defined by the following equations:

$$s_k[n] = x[n] + 2\cos\left(\frac{2\pi k}{N}\right) s_k[n-1] - s_k[n-2] \quad (1)$$

$$y_k[n] = s_k[n] - W_N^k s_k[n-1] \quad (2)$$

$$X[k] = y_k[N] \quad (3)$$

Where x[n] is the N-point input signal, sk[n] and yk[n] are intermediate variables used in calculating X[k], which is the kth N-point (FFT) coefficient of x[n]. $W_N$ may be defined as $$e^{-j\frac{2\pi}{N}}.$$

Thus, the Goertzel algorithm may be thought of as a filter that checks for a specific frequency within a given signal. A straightforward implementation of the Goertzel algorithm would calculate X[k] by iterating equations (1) and (2) for n=0 to N. However, computations may be saved by noting that the value of interest is the square of X[k], which may be written as $$|X[k]|^2 = |s_k[N]|^2 - 2\cos\left(\frac{2\pi k}{N}\right)s_k[N]s_k[N-1] + |s_k[N-1]|^2 \quad (4)$$

Therefore we may only need to iterate equation (1) for n=0 to N and substituting the result into equation (4) to get the square of X[k]. Accordingly, in one embodiment, tone detection unit 305 fixes N=40 and calculates $|X[2]|^2$, $|X[3]|^2$, $|X[4]|^2$, and $|X[5]|^2$, which correspond to the energy in each of the 400, 600, 800, and 1000 Hz tones, respectively.

Figure 4:
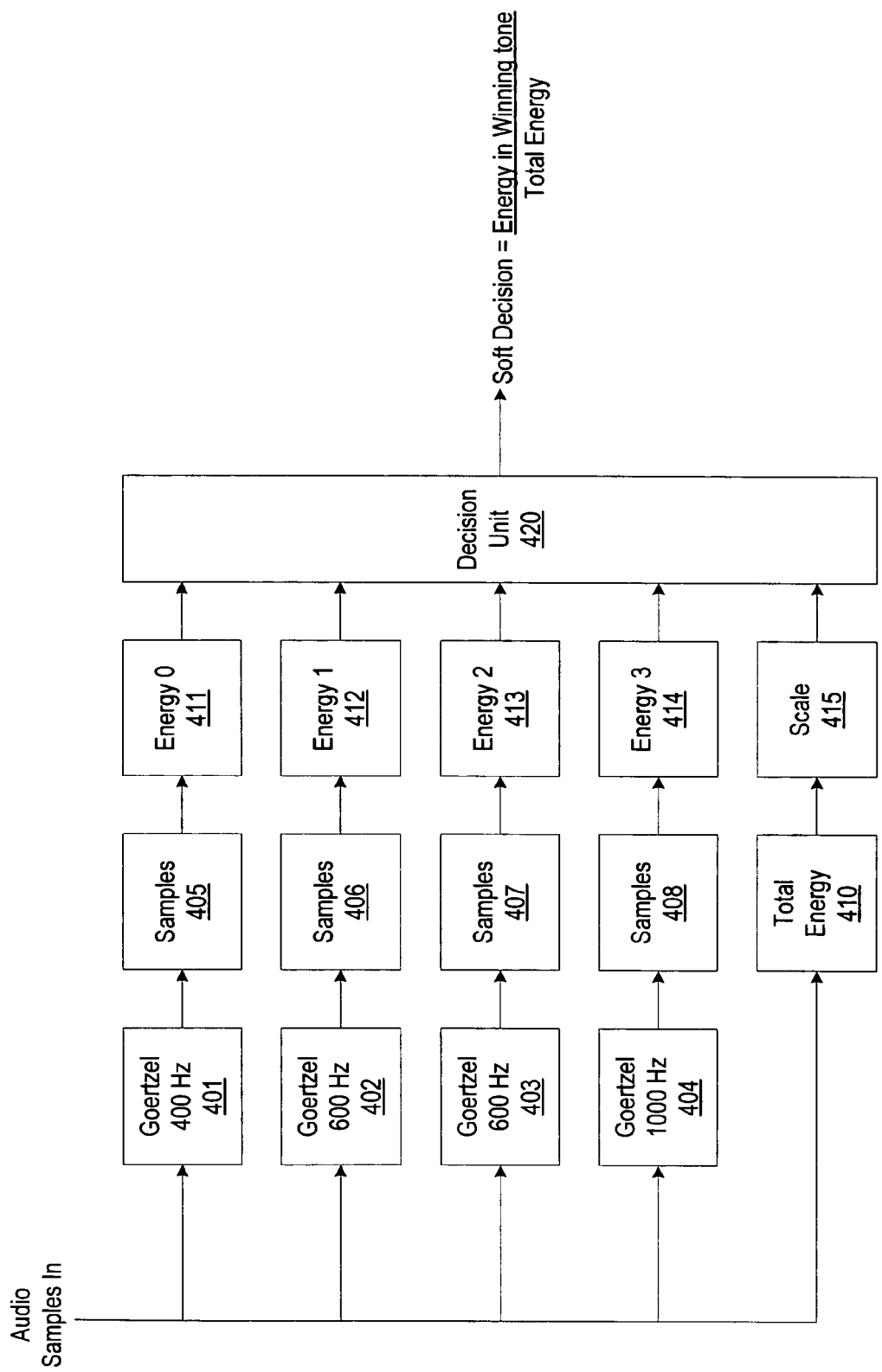
FIG. 4 is a block diagram showing more detailed aspects of one embodiment of the tone detection unit shown in FIG. 3.

FIG. 4 is a diagram of one embodiment of the tone detection unit of FIG. 3. As described above, tone detection unit 305 uses the results of the Goertzel algorithm to calculate the energy in each received tone. As shown in FIG. 4, the received audio samples are input to five parallel branches, four of which calculate the energy in each tone while the fifth branch calculates the total energy for a given window of 40 samples. The resulting five energy values are used by decision unit 420 to determine which bit pair may be represented by the received tones and to assign a reliability or confidence factor to the bit pair.

In the illustrated embodiment, the first branch, which includes Goertzel unit 401, sample block 405, and energy block 411, calculates the energy of the 400 Hz tone. The second branch, which includes Goertzel unit 402, sample block 406, and energy block 412, calculates the energy of the 600 Hz tone. The third branch, which includes Goertzel unit 403, sample block 407, and energy block 413, calculates the energy of the 800 Hz tone. The fourth branch, which includes Goertzel unit 404, sample block 408, and energy block 414, calculates the energy of the 1000 Hz tone.

In one embodiment, Goertzel units 401, 402, 403, and 404 may each implement equation 1 to calculate the amplitude of the 400 Hz, 600 Hz, 800 Hz, and 1000 Hz frequency components, respectively, in the input audio sample. Sample blocks 405, 406, 407, and 408 represent fixing the sample size to 40. Energy blocks 411, 412, 413, and 414 may each implement equation 4 to calculate the energy of the respective tones. Total energy block 410 calculates the sum of all energy of the received audio samples. More particularly, energy block 410 may calculate the total energy associated with a symbol in the time domain irrespective of which frequencies may be included in the symbol. Scale unit 415 represents a scaling function that scales the time domain energy by a factor of N such that if the total energy is found to be in one frequency, the soft decision associated with that frequency will yield a value of 1.

As described above decision unit 420 may receive the energy calculations from each branch and based upon those calculations, make soft decisions about the bit pairs represented by the received tones. More particularly, a soft decision may be a representation of each bit in the bit pair. The representation may include hard information indicative of the value of each bit and other information and the may be interpreted as a reliability value for each of the soft decisions. In one embodiment, the other information of the soft decision may be calculated as: Energy in the winning tone/Total energy. As such, decision unit 420 may include logic that may be represented by the following exemplary pseudo code:

If totalEnergy<totalEnergyThreshold
SoftDecision Bit0=0
SoftDecision Bit1=0
Else if energy400 is greater than energy600, energy800, and energy1000
SoftDecision Bit0=+energy400/totalEnergy
SoftDecision Bit1=+energy400/totalEnergy
Else if energy600 is greater than energy400, energy800, and energy1000
SoftDecision Bit0=+energy600/totalEnergy
SoftDecision Bit1=−energy600/totalEnergy
Else if energy800 is greater than energy400, energy600, and energy1000
SoftDecision Bit0=−energy800/totalEnergy
SoftDecision Bit1=+energy800/totalEnergy
Else if energy1000 is greater than energy400, energy600, and energy800
SoftDecision Bit0=−energy1000/totalEnergy
SoftDecision Bit1=−energy1000/totalEnergy In the above example, the soft decisions are sign and magnitude representations of each bit in a bit pair. For example, a binary zero is represented as a positive number and a binary one as a negative number. The magnitude of the soft decision value may be the value calculated as described above. For example, if most of the energy (e.g., 80% of total energy) is found to be in the 600 Hz branch, decision unit 420 may, according to the pseudo code example, provide a soft decision for bit0=+0.8, and a soft decision for bit1=−0.8. This represents a bit pair where bit 0=0 and bit 1=1 with an 80% confidence or reliability. These soft decisions may be provided to Viterbi decoder 315 of FIG. 3.

Figure 5:
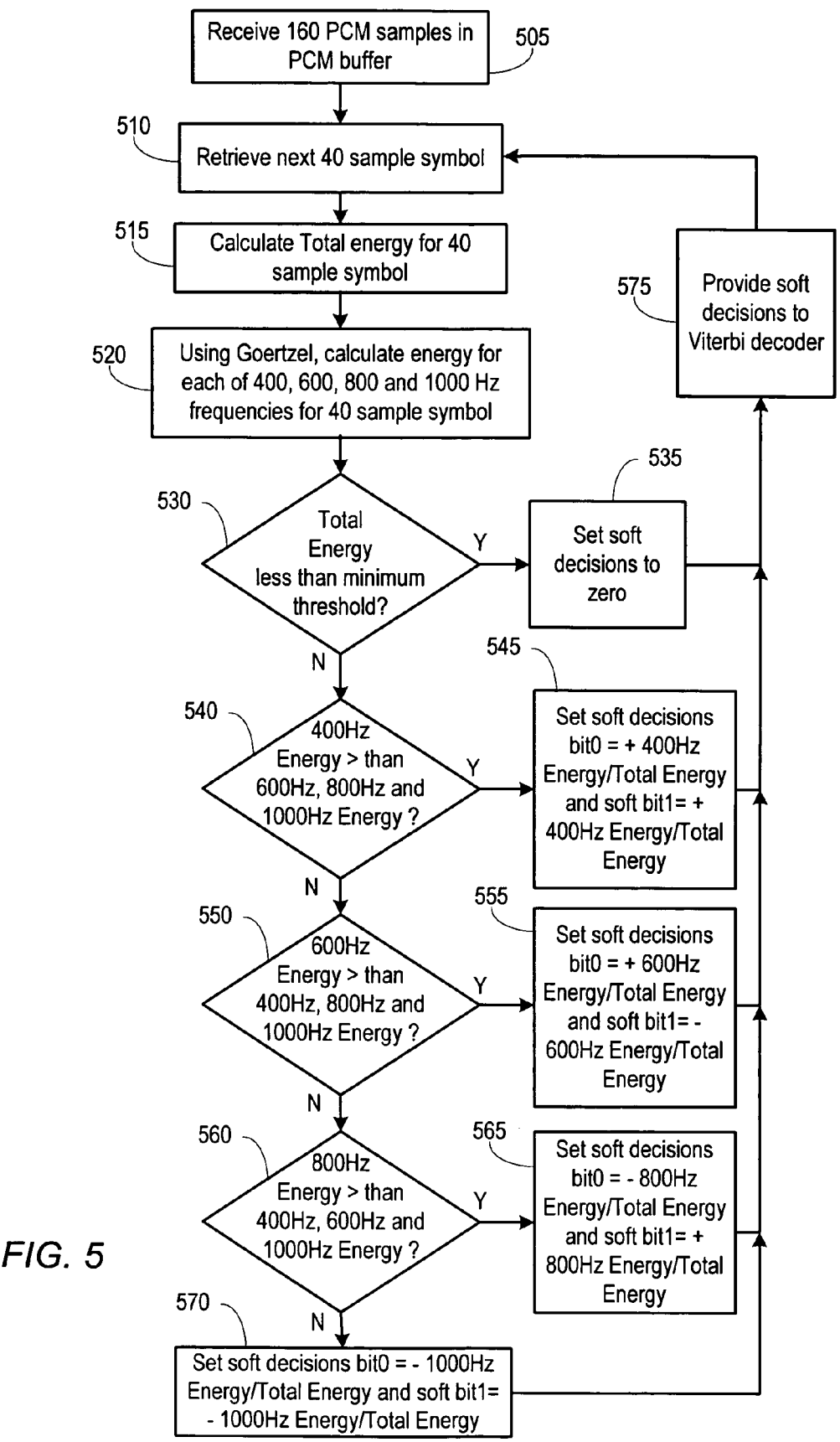
FIG. 5 is a flow diagram describing the operation of one embodiment of the tone detection unit shown in FIG. 3.

In the above example the same soft decision magnitude value was used for each bit of the bit pair. In an alternative embodiment, the soft decision magnitude value may be calculated independently for each bit represented in the symbol. More particularly, the energy of the two tones that have common bits for a given bit location may be added. For example, if the highest energy is found to be in the 800 Hz tone, the soft decision for bit0 may be calculated by summing the energies in the 800 Hz and 1000 Hz tones and dividing the sum by the total energy (since both the 800 Hz and 1000 Hz tones map bit0 to a 1). Similarly, the soft decision for bit1 may be calculated by summing the energies in the 400 Hz and 800 Hz tones and dividing the sum by the total energy (since both the 400 Hz and 800 Hz tones map bit1 to 0). In this embodiment, decision unit 420 may include logic that may be represented by the following exemplary pseudo code:

If totalEnergy<totalEnergyThreshold
SoftDecision Bit0=0
SoftDecision Bit1=0
Else if energy400 is greater than energy600, energy800, and energy1000
SoftDecision Bit0=+(energy400+energy600)/totalEnergy
SoftDecision Bit1=+(energy400+energy800)/totalEnergy
Else if energy600 is greater than energy400, energy800, and energy1000
SoftDecision Bit0=+(energy800+energy1000)/totalEnergy
SoftDecision Bit1=−(energy400+energy800)/totalEnergy
Else if energy800 is greater than energy600, energy400, and energy1000
SoftDecision Bit0=−(enegy400+energy600)/totalEnergy
SoftDecision Bit1=+(energy600+energy1000)/totalEnergy
Else if energy1000 is greater than energy600, energy800, and energy400
SoftDecision Bit0=−(energy800+energy1000)/totalEnergy
SoftDecision Bit1=−(energy600+energy1000)/totalEnergy Turning to FIG. 5, a flow diagram describing the operation of one embodiment of the tone detection unit shown in FIG. 3 is shown. Referring collectively to FIG. 3 through FIG. 5, in one embodiment, PCM buffer 301 receives and stores 160 PCM audio samples that may correspond to four, 40-sample CTM symbols (block 505). Tone detection unit 305 retrieves a CTM symbol of 40 samples from PCM buffer 301 (block 510). Tone detection unit 305 calculates the total received energy in the 40-sample symbol. The total energy value is scaled using the 40-sample window size (block 515).

In addition, tone detection unit 305 may determine the energy associated with each CTM tone that may be present in the retrieved 40-sample symbol. For example, the results of the Goertzel algorithm as described above, may be used to calculate the energy associated with each frequency (e.g., 400 Hz, 600 Hz, 800 Hz, and 1000 Hz) that may be in the 40-sample symbol (block 520).

Once the respective energy values have been calculated, they are provided to decision unit 420. Decision unit 420 determines whether the total energy is above a minimum threshold value. If the total energy is below a minimum value (block 530), decision unit 420 may set the soft decisions to zero or some other predetermined value that may indicate that the soft decision has little confidence (block 535). These soft decisions may be provided to Viterbi decoder 315 (block 575) and operation may proceed as described above in block 510.

Referring back to block 530, if the total energy is above a minimum threshold, decision unit 420 may determine whether the energy associated with the 400 Hz tone is greater than the energies associated with any of the 600 Hz, 800 Hz, or 1000 Hz tones (block 540). However, if the 400 Hz energy is greater, decision unit 420 may set the soft decision for bit0 equal to + the calculated ratio value and the soft decision for soft bit equal to + the calculated ratio value. For example, if the 400 Hz energy is 75% of the total energy, decision unit 420 may set the soft decision for bit0 equal to +0.75 and soft decision for bit 1 equal to +0.75 (block 545), which may correspond to a 00b bit pair with a 75% reliability. Operation may proceed as described above in block 575.

However, if the 400 Hz energy is not greater than the energies associated with any of the 600 Hz, 800 Hz, or 1000 Hz tones (block 540), decision unit 420 may determine whether the energy associated with the 600 Hz tone is greater than the energies associated with each of the 400 Hz, 800 Hz or 1000 Hz tones (block 550). If the 600 Hz energy is greater, decision unit 420 may set the soft decision for bit0 equal to + the calculated ratio value and soft decision for bit1 equal to − the calculated ratio value. For example, if the 600 Hz energy is 95% of the total energy, decision unit 420 may set the soft decision for bit0 equal to +0.95 and the soft decision for bit1 equal to −0.95 (block 555), which may correspond to a 01b bit pair with a 95% reliability. Operation may proceed as described above in block 575.

Referring back to block 550, if the 600 Hz energy is not greater than the energies associated with any of the 400 Hz, 800 Hz, or 1000 Hz tones, decision unit 420 may determine whether the energy associated with the 800 Hz tone is greater than the energies associated with any of the 400 Hz, 600 Hz, or 1000 Hz tones (block 560).

If the 800 Hz energy is greater, decision unit 420 may set the soft decision for bit0 equal to − the calculated ratio value and soft decision for bit1 equal to + the calculated ratio value. For example, if the 800 Hz energy is 85% of the total energy, decision unit 420 may set the soft decision for bit0 equal to −0.85 and the soft decision for bit1 equal to +0.85 (block 565), which may correspond to a 10b bit pair with an 85% reliability. Operation may proceed as described above in block 575.

However, if the 800 Hz energy is not greater than the energies associated with any of the 400 Hz, 600 Hz, or 1000 Hz tones (block 560), decision unit 420 may set the soft decision for bit0 equal to − the calculated ratio value and the soft decision for bit1 equal to − the calculated ratio value. For example, if the 1000 Hz energy is 75% of the total energy, decision unit 420 may set the soft decision for bit0 equal to −0.75 and soft decision for bit1 equal to −0.75 (block 555), which may correspond to a 11b bit pair with a 75% reliability. Operation may proceed as described above in block 575.

During operation of the tone detection unit 305, synchronization unit 310 may be configured to track the CTM symbols and to dynamically adjust each retrieved symbol to overcome phase shifting of the received symbols. For example, in one embodiment, synchronization unit 310 may successively calculate a running average of expected values for each sample in the 40-sample symbol.

Figure 6A:
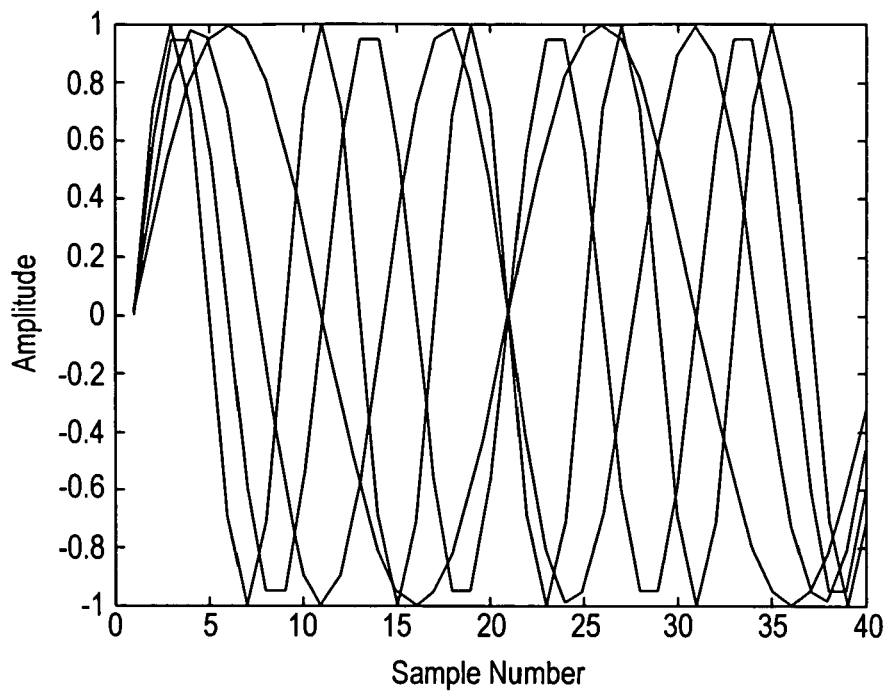
FIG. 6A is a diagram illustrating four exemplary time-aligned CTM tones.
Figure 6B:
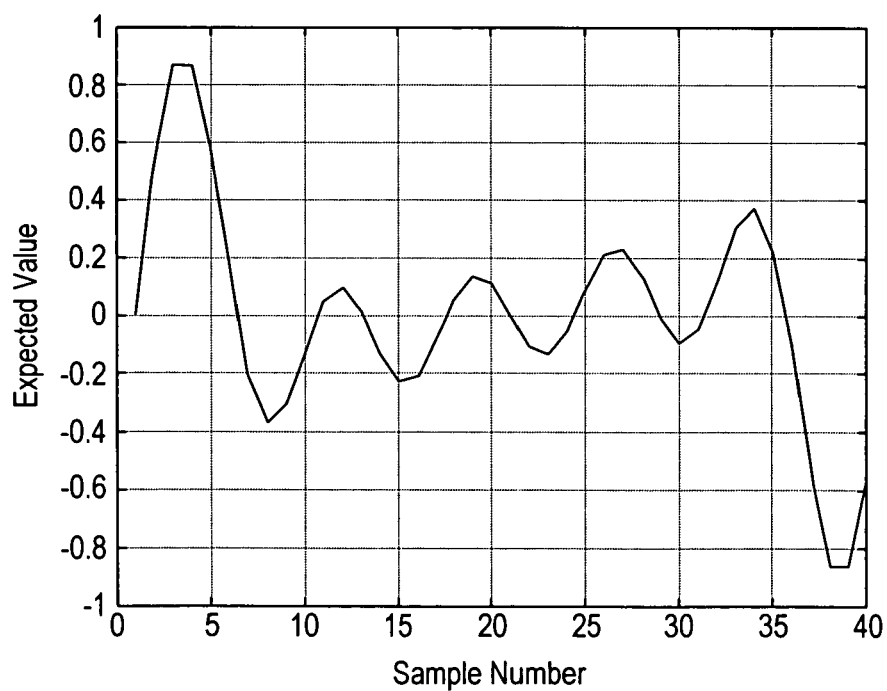
FIG. 6B is a diagram showing an exemplary plot of expected values for each sample of a received CTM symbol averaged over time.

FIG. 6A is a diagram illustrating four exemplary time-aligned CTM tones and FIG. 6B is a diagram showing an exemplary plot of expected values for each sample of a received CTM symbol averaged over time. As shown in FIG. 6A, all four possible CTM tones (e.g., 400 Hz, 600 Hz, 800 Hz, and 1000 Hz) are plotted with perfect time alignment as they might be transmitted from a transmitter. By noting that all four signals follow a similar trend at the very beginning of the burst as well as the very end, a signature plot (e.g., FIG. 6B) may be produced and exploited. Since each tone may be equally probable, the expected value for each received sample may be the average of the four tones shown in FIG. 6A.

The signature plot includes a prominent positive peak near the beginning of the plot and a negative peak near the end of the plot. In other words, the four signals tend to align themselves at the beginning and end of a symbol. In one embodiment, synchronization unit 310 may exploit the signature by tracking these peaks to determine if there is a misalignment and in which direction. Synchronization unit 310 may average received symbols to obtain a 40-sample expected value for each sample. In one embodiment, the averaging function may be accomplished by using a first order infinite impulse response (IIR) filter having the form $$\text{average}[n] = \alpha \text{average}[n] + (1-\alpha)\text{symbol}[n] \quad (5)$$

where $\alpha$ is a constant between 0 and 1. Averaging may also ensure that any noise that may have been introduced during transmission may be smoothed out. In one embodiment, synchronization may be accomplished by shifting samples in PCM buffer 301 in the appropriate direction based on the detected misalignment in the peaks of the expected value. For example, the positive peak in the expected value signature plot may be expected to be at sample 3 or 4 under perfect alignment. In one embodiment, synchronization unit 310 may include logic that implements the following pseudo code to keep track of the peak and to adjust sample timing based on the peak location.

Tmax=value at positive peak
Imax=index of positive peak
Tmin=value of negative peak
Imin=index of negative peak
Thresh=reliability threshold for peaks in the expected value vector.
If Tmax>Thresh and Tmin<−Thresh
If Imax>4 and Imax<=23
Misaligned to the right:
Remove sample
If Imax<3 and Imax>=24
Misaligned to the left:
Add sample In one embodiment, it may be assumed that if the peak is located at index 3 or 4 the CTM symbol may be perfectly aligned. However, if the maximum peak occurs outside this range, the CTM symbol may need timing adjustment. If the peak is located to the right of its nominal location, the CTM symbol timing adjustment may be made by removing samples to force the CTM symbol to shift to the left. However, as shown in the above pseudo code, if the peak is located more than 20 samples away to the right of the nominal location, instead of shifting the peak to the left, it may be more efficient to insert extra samples to shift the CTM symbol to the right, which may bring the CTM symbol to perfect alignment faster. Once the direction of the misalignment is found, in one embodiment, a correction may be applied by either removing or inserting one sample into the received CTM symbol. As such, the correct alignment may be obtained in steps of one sample at a time. However it is contemplated that in other embodiments, the correct alignment may be obtained by removing or inserting more than one sample at a time, where the number of samples inserted or removed may be derived from Tmax or Tmin, or both.

Accordingly, synchronization unit 310 may be configured to remove or insert samples from the next 40-sample symbol retrieved from PCM buffer 301. For example, synchronization unit 310 may provide a +/− sample signal to PCM buffer 301. In one embodiment, in response to the +/− sample signal, upon the next retrieval of a symbol, the number of samples may be increased by one or decreased by one.

In one implementation, to remove a sample, only the last 39 samples of a 40-sample group may be used within the 160-sample PCM buffer 301. In contrast, if a sample needs to be added, a zero sample may be inserted at the beginning of a 40-sample group within the 160-sample PCM buffer 301.

It is noted that in another embodiment, when tracking the peak expected value, Imin may be used instead of Imax. Alternatively, to improve the robustness of the tracking algorithm, both peaks may be tracked. As such, Imin may be used in addition to Imax.

Figure 7:
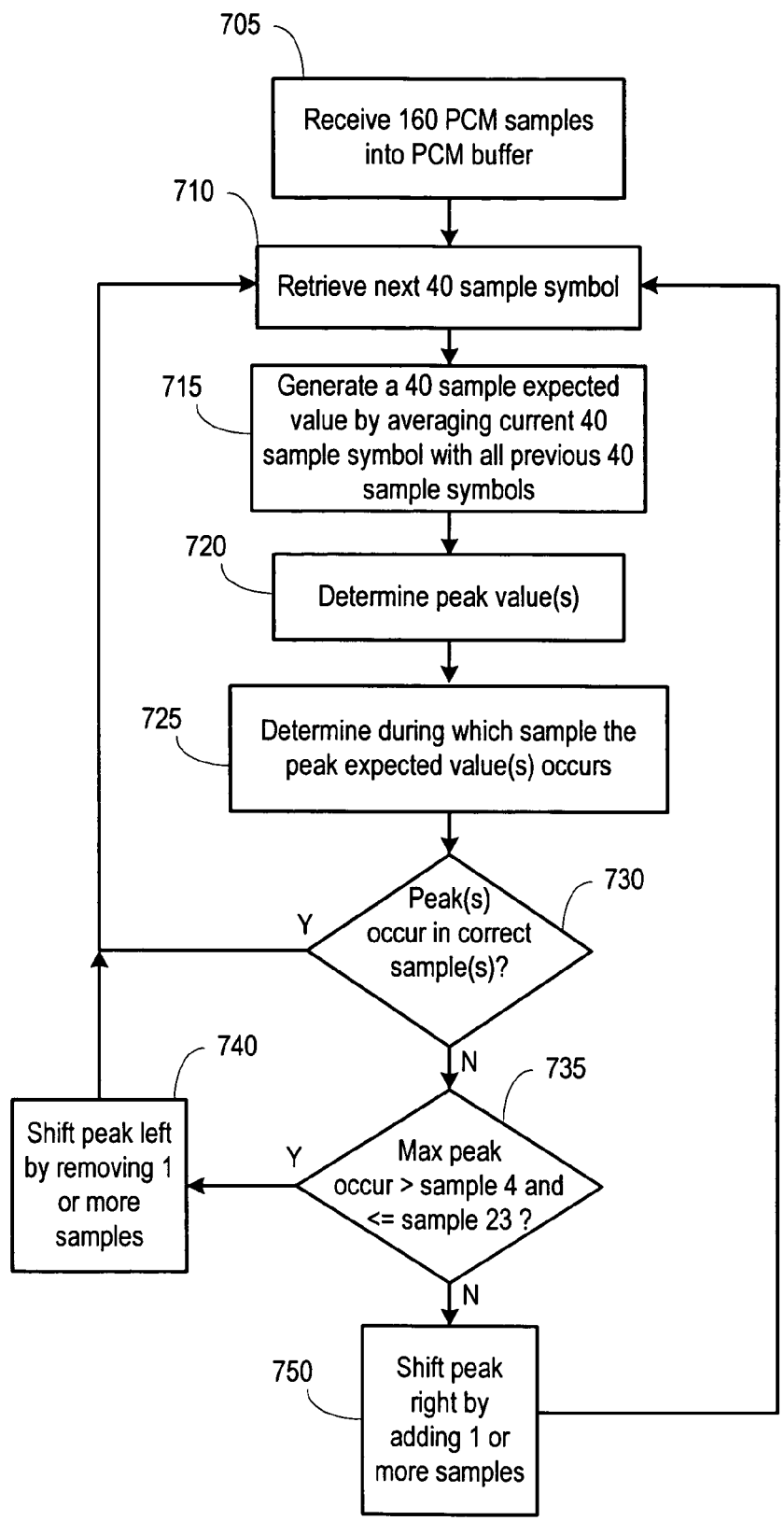
FIG. 7 is a flow diagram describing the operation of one embodiment of the synchronization unit shown in FIG. 3.

Referring to FIG. 7, a flow diagram describing the operation of one embodiment of synchronization unit 310 is shown. Referring collectively to FIG. 3, FIG. 6A, FIG. 6B and FIG. 7, in one embodiment, PCM buffer 301 receives and stores 160 PCM audio samples that may correspond to four, 40-sample CTM symbols (block 705). During the time in which tone detection unit 305 retrieves a CTM symbol of 40 samples from PCM buffer 301, synchronization unit 310 also retrieves a 40-sample CTM symbol of from PCM buffer 301 (block 710). Synchronization unit 310 generates a 40-sample expected value by averaging using an IIR filter, for example, as described above (block 715). For example, an expected value vector including 40 samples may be created. Each sample location of the expected value vector is an average value. As a new 40-sample symbol is retrieved, each respective sample of the symbol is averaged with the expected value sample in the corresponding location in the expected value vector. An exemplary expected value plot is shown in FIG. 6B. The signature of the expected value plot may be used by synchronization unit 310 to determine the peak expected values (block 720) and during which sample the peak expected value occurs (block 725).

Synchronization unit 310 determines whether the peaks are in the correct alignment (block 730). For example, in one embodiment, the positive peak may occur in sample 3 or sample 4, while the negative peak may occur in sample 38 or 39. In the example of FIG. 7, synchronization unit 310 is tracking the positive peak. If the peak occurs in the correct sample, operation proceeds as described above in block 705.

However, referring back to block 730, if the peak does not occur in the correct sample, the samples are misaligned and synchronization unit 310 determines if the peak occurs within the range of samples 5 to 23 (block 735). If the peak occurs within the range of samples 5 to 23, the peak is misaligned to the right. Accordingly, synchronization unit 310 may send a signal to PCM buffer 301 that indicates that a sample should be removed from the next symbol (block 740), thereby shifting the peak to the left on the next symbol. Operation of synchronization unit 310 proceeds as described above in block 705.

Referring back to block 735, if the peak occurs outside the range of samples 5 to 23, the peak is misaligned far to the right. However, as described above, rather than attempting to shift the peak to the left to correct the misalignment, synchronization unit 310 may shift the peak further to the right until is aligned again. More particularly, synchronization unit 310 may send a signal to PCM buffer 301 that indicates that a sample should be added to the next symbol (block 740), thereby shifting the peak to the right on the next symbol. Operation of synchronization unit 310 proceeds as described above in block 705.

It is noted that in various alternative embodiments, the misaligned CTM symbol may be shifted to the left to correct the misalignment when the symbol is misaligned by more than the specified range to the right, even though the embodiments described above shift the CTM symbol to the right to obtain faster alignment.

Figure 8:
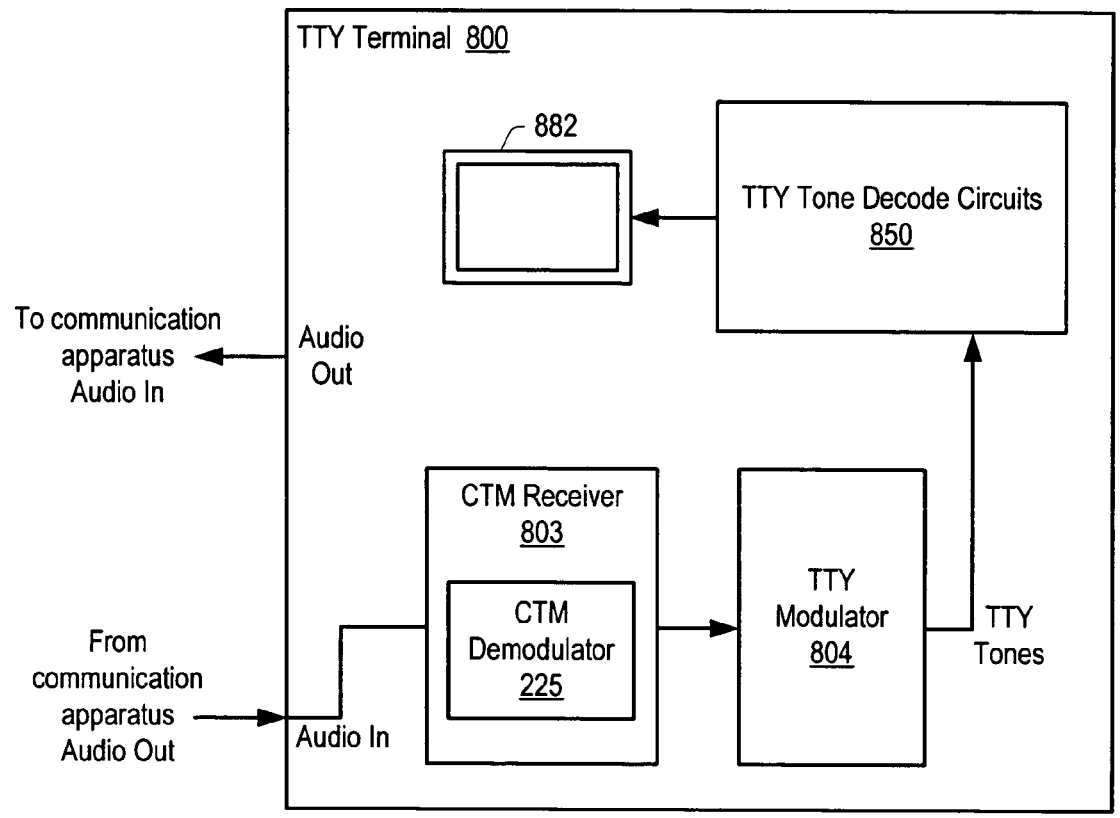
FIG. 8 is a generalized block diagram of one embodiment of a TTY terminal including the CTM demodulator of FIG. 3.

It is also noted that the CTM receiver circuit 203 that includes CTM demodulator circuit 225 illustrated in FIG. 3 may be used in a communication apparatus other than a mobile telephone. For example, turning to FIG. 8 a generalized block diagram of one embodiment of a TTY terminal including the CTM demodulator 225 of FIG. 3 is shown. TTY terminal 800 employs a CTM receiver 803 which includes CTM demodulator 225. The CTM receiver 803 is coupled to a TTY modulator 804. As such, TTY terminal 800 may be used with a conventional communication apparatus such as a standard mobile telephone that does not have CTM demodulation capability.

Accordingly, in such an embodiment, a conventional communication apparatus may process received audio that includes CTM symbols in the same way as normal speech audio. The audio may be provided via an audio input terminal of TTY terminal 800. CTM demodulator 225 of FIG. 8 may be configured to demodulate the CTM symbols in the received audio into symbol bits, 40 samples at a time. The symbol bits may be modulated by TTY modulator 804 into TTY tones according to the Baudot code or other suitable mapping. The TTY modulated signal may be provided to TTY tone decode circuits 850, which may decode the tones and display the corresponding characters on display 882. For specific operational details of CTM demodulator 225, refer to the description of CTM demodulator 225 included above in the description of FIG. 3. It is noted that various other circuits within TTY terminal 800 are not shown for simplicity. For example, in one embodiment, TTY terminal 800 may include a CTM transmitter (not shown) having a CTM modulator (not shown).

It is also noted that in other embodiments, a communication apparatus such as communication apparatus 100 of FIG. 1 may include TTY terminal functionality. For example, communication apparatus 100 already includes a keypad 124 and display 122. Thus, adding TTY functionality to communication apparatus 100 may include adding circuits that translate text characters entered from the keypad 124 directly to CTM symbols. Similarly, the additional circuits may translate received CTM symbols directly for display on display 122. It is further noted that CTM demodulator 225 may be used in such an embodiment.

It is further noted that although the above embodiments have been described in the context of demodulating and synchronizing symbols that correspond to CTM tones, it is contemplated that the apparatus and methods described above may be used to demodulate any type of signal that uses tones as symbols. More particularly, a demodulator circuit such as CTM demodulator 225 may be used to detect other tones (frequencies) in other types of signals and to generate soft decisions and/or bits that map to the tones. In such embodiments, other symbols that represent any number of respective bits may use any number of frequencies. For example, a given symbol may represent three bits and may be encoded using one of eight frequencies. In addition, CTM demodulator 225 may keep the received symbols synchronized in time, as described in the embodiments above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A communication apparatus comprising:
a receiver including a demodulator unit configured to receive a signal including one or more frequencies associated with a symbol,
wherein the demodulator unit is configured to determine the one or more frequencies,
wherein the demodulator unit is further configured to calculate a respective energy value associated with each of the one or more frequencies,
wherein the demodulator unit is further configured to calculate a total energy value associated with the signal,
wherein the demodulator unit is configured to generate a soft decision corresponding to the one or more frequencies based upon energies associated with the one or more frequencies, and
wherein the demodulator unit is configured to calculate a ratio of the energy value associated with at least one frequency of the one or more frequencies having a largest amplitude to the total energy value.

2. The communication apparatus as recited in claim 1, wherein the demodulator unit is further configured to determine an amplitude corresponding to each of one or more frequencies.

3. The communication apparatus as recited in claim 2, wherein the demodulator unit is further configured to use a Goertzel algorithm to determine the amplitude corresponding to each of one or more frequencies.

4. The communication apparatus as recited in claim 2, wherein the demodulator unit is configured to use a fast Fourier transform (FFT) algorithm to determine the amplitude corresponding to each of one or more frequencies.

5. The communication apparatus as recited in claim 1, wherein each frequency combination of the one or more frequencies represents a number of bits having a respective bit value.

6. The communication apparatus as recited in claim 5, wherein the demodulator unit is further configured to assign the soft decision to each bit of the number of bits based upon the value of the ratio.

7. A communication apparatus comprising:
a receiver including a demodulator unit configured to receive a signal including one or more frequencies associated with a symbol,
determine the one or more frequencies and to generate a soft decision corresponding to the one or more frequencies based upon energies associated with the one or more frequencies,
calculate a respective energy value associated with each of one or more frequencies,
calculate a total energy value associated with the signal, wherein each frequency combination of the one or more frequencies represents a number of bits having a respective bit value,
for each bit of the number of bits, calculate a respective ratio of a sum of energies of any frequencies corresponding to a same bit value to the total energy associated with the signal; and
assign a respective soft decision to each bit of the number of bits based upon the value of the respective ratio.

8. The communication apparatus as recited in claim 5, wherein the demodulator unit is further configured to calculate a ratio of energies associated with at least one frequency of the one or more frequencies having a largest amplitude to an energy associated with a different frequency of the one or more frequencies.

9. The communication apparatus as recited in claim 1, wherein the symbol comprises a text telephone symbol that includes a plurality of bits encoded according to a cellular text telephone modem (CTM) protocol that includes four different frequencies.

10. A method of demodulating tones with a communication apparatus comprising:
the communication apparatus receiving a signal including one or more frequencies associated with a symbol;
the communication apparatus determining the one or more frequencies;
the communication apparatus calculating a respective energy value associated with each of the one or more frequencies;
the communication apparatus calculating a total energy value associated with the signal;
the communication apparatus generating a soft decision corresponding to the one or more frequencies based upon energies associated with the one or more frequencies; and
the communication apparatus calculating a ratio of an energy associated with at least one frequency of the one or more frequencies having a largest amplitude to the total energy value associated with the signal.

11. The method as recited in claim 10, further comprising determining an amplitude corresponding to each of one or more frequencies.

12. The method as recited in claim 11, further comprising determining the amplitude corresponding to each of one or more frequencies using a Goertzel algorithm.

13. The method as recited in claim 11, further comprising determining the amplitude corresponding to each of one or more frequencies using a fast Fourier transform (FFT) algorithm.

14. The method as recited in claim 11, wherein each frequency combination of the one or more frequencies represents a number of bits having a respective bit value.

15. The method as recited in claim 14, further comprising assigning the soft decision to each bit of the number of bits based upon the value of the ratio.

16. The method as recited in claim 14, further comprising:
for each bit of the number of bits, calculating a respective ratio of a sum of energies of any frequencies corresponding to a same bit value to the total energy associated with the signal; and
assigning a respective soft decision to each bit of the number of bits based upon the value of the respective ratio.

17. The method as recited in claim 14, further comprising calculating a ratio of energies associated with at least one frequency of the one or more frequencies having a largest amplitude to the an energy associated with a different frequency of the one or more frequencies.

18. The method as recited in claim 10, wherein the symbol comprises a text telephone symbol that includes a plurality of bits encoded according to a cellular text telephone modem (CTM) protocol that includes four different frequencies.

19. The apparatus of claim 7, wherein the demodulator unit comprises:
a tone detection unit;
a synchronization unit; and
a decoder in communication with the tone detection unit.

20. The apparatus of claim 19, wherein the decoder comprises a Viterbi decoder.

21. The apparatus of claim 7, wherein the demodulator unit is further configured to use a Goertzel algorithm to determine an amplitude corresponding to each of one or more frequencies.

22. The apparatus of claim 7, wherein the demodulator unit is configured to use a fast Fourier transform (FFT) algorithm to determine an amplitude corresponding to each of one or more frequencies.

23. The apparatus of claim 7, wherein the demodulator unit is further configured to assign the soft decision to each bit of the number of bits based upon the value of the ratio.

24. The apparatus of claim 7, wherein the demodulator unit is further configured to calculate a ratio of energies associated with at least one frequency of the one or more frequencies having a largest amplitude to an energy associated with a different frequency of the one or more frequencies.

25. The apparatus of claim 7, wherein the symbol comprises a text telephone symbol that includes a plurality of bits encoded according to a cellular text telephone modem (CTM) protocol that includes four different frequencies.

* * * * *

UNITED STATES PATENT AND TRADEMARK OFFICE
CERTIFICATE OF CORRECTION

PATENT NO. : 7,620,122 B1
APPLICATION NO. : 11/170526
DATED : November 17, 2009
INVENTOR(S) : Guner Arslan Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Twenty-sixth Day of October, 2010

David J. Kappos
*Director of the United States Patent and Trademark Office*